(12) United States Patent
Merritt et al.

(10) Patent No.: US 8,620,315 B1
(45) Date of Patent: Dec. 31, 2013

(54) MULTI-TIERED ANTI-ABUSE REGISTRATION FOR A MOBILE DEVICE USER

(75) Inventors: Arthur Merritt, San Francisco, CA (US); Zhaowei Charlie Jiang, Palo Alto, CA (US); James Liang, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1464 days.

(21) Appl. No.: 11/536,975

(22) Filed: Sep. 29, 2006
(Under 37 CFR 1.47)

(51) Int. Cl.
*H04W 4/00* (2009.01)
*H04M 1/66* (2006.01)
*H04M 3/16* (2006.01)
*G06F 15/16* (2006.01)
*H04K 1/00* (2006.01)

(52) U.S. Cl.
USPC ........ 455/435.1; 455/410; 709/217; 709/227; 380/247; 380/249

(58) Field of Classification Search
USPC .............................. 455/435.1, 403, 410, 411; 709/217–219, 227–229; 380/247–249
See application file for complete search history.

(56) References Cited

U.S. PATENT DOCUMENTS

| | | | |
|---|---|---|---|
| 5,758,088 A | | 5/1998 | Bezaire et al. |
| 5,963,867 A | * | 10/1999 | Reynolds et al. ............. 455/457 |
| 6,006,266 A | | 12/1999 | Murphy, Jr. et al. |
| 6,021,433 A | | 2/2000 | Payne et al. |
| 6,167,426 A | | 12/2000 | Payne et al. |
| 6,286,104 B1 | | 9/2001 | Buhle et al. |
| 6,366,761 B1 | * | 4/2002 | Montpetit ..................... 455/12.1 |
| 6,430,624 B1 | | 8/2002 | Jamtgaard et al. |
| 6,496,824 B1 | | 12/2002 | Wilf |
| 6,735,614 B1 | | 5/2004 | Payne et al. |
| 6,741,681 B2 | | 5/2004 | Meyer |
| 6,871,236 B2 | | 3/2005 | Fishman et al. |
| 6,947,725 B2 | | 9/2005 | Aura |
| 7,113,981 B2 | * | 9/2006 | Slate ............................. 709/217 |
| 7,139,573 B2 | * | 11/2006 | Barrow et al. ............. 455/435.1 |
| 2002/0138635 A1 | * | 9/2002 | Redlich et al. ................ 709/229 |

(Continued)

OTHER PUBLICATIONS

"Captcha," (Mar. 12, 2006). In *Wikipedia, The Free Encyclopedia..* 07:41 UTC. Wikimedia Foundation, Inc. Feb. 26, 2007 <http://en.wikipedia.org/w/index.php?title=Captcha&oldid=43407448>.

(Continued)

*Primary Examiner* — Matthew Sams
(74) *Attorney, Agent, or Firm* — James J. DeCarlo; Greenberg Traurig, LLP

(57) ABSTRACT

Various embodiments are directed to providing a multi-tiered anti-abuse approach to registration of a mobile device user. A registration service may determine whether communications with the mobile device is through a trusted carrier gateway, and if so, then a mobile device identifier may be used to automatically register the mobile device. Otherwise, a determination may be made whether the mobile device is configured to support a challenge-response image. In one embodiment, such determination may be based, in part, on information received from the mobile device through a user agent, or the like. If the mobile device is capable of supporting a challenge-response image, one may be sent to the mobile device to enable registration. If, however, the mobile device does not support the challenge-response image and the carrier gateway is not trusted, the mobile device may be directed to employ an SMS mechanism to complete registration.

10 Claims, 4 Drawing Sheets

(56) References Cited

U.S. PATENT DOCUMENTS

| | | | |
|---|---|---|---|
| 2002/0191795 A1 | 12/2002 | Wills | |
| 2003/0061515 A1 | 3/2003 | Kindberg et al. | |
| 2003/0097564 A1 | 5/2003 | Tewari et al. | |
| 2003/0117365 A1* | 6/2003 | Shteyn | 345/156 |
| 2003/0166397 A1 | 9/2003 | Aura | |
| 2003/0167334 A1 | 9/2003 | Butler | |
| 2003/0233329 A1 | 12/2003 | Laraki et al. | |
| 2004/0185777 A1 | 9/2004 | Bryson | |
| 2005/0176449 A1* | 8/2005 | Cui et al. | 455/466 |
| 2005/0202822 A1* | 9/2005 | Park et al. | 455/436 |
| 2006/0206709 A1* | 9/2006 | Labrou et al. | 713/167 |

OTHER PUBLICATIONS

"Turing test," (Feb. 20, 2007). In *Wikipedia, The Free Encyclopedia*. 12:23 UTC. Wikimedia Foundation, Inc. Feb. 26, 2007 <http://en.wikipedia.org/w/index.php?title=Turing_test&oldid=109540488>.

Passani, L., "What's the WURFL?" (accessed Oct. 24, 2007)http://wurfl.sourceforge.net.

Passani, L., "Welcome to the WURFL, the Wireless Universal Resource File," (accessed Oct. 24, 2007) http://wurfl.sourceforge.net.

Sybase Performance and Tuning: Locking, Adaptive Server Enterprise 12.5.1, Chapter 7 How Indexes Work, Aug. 2003, 4 pgs.

"Volantis: Content Delivery Platform," Volantis Systems, 9 pages, http://www.volantis.com/content-delivery-platform (accessed Aug. 29, 2008).

Transmittal of International Preliminary Report on Patentability, mailed Nov. 9, 2006.

Office Communication mailed Jun. 14, 2006 for U.S. Appl. No. 10/767,004.

Office Communication mailed Nov. 17, 2006 for U.S. Appl. No. 10/767,004.

Office Communication mailed Feb. 1, 2007 for U.S. Appl. No. 10/767,004.

Office Communication mailed Apr. 13, 2007 for U.S. Appl. No. 10/767,004.

Office Communication mailed Sep. 13, 2007 for U.S. Appl. No. 10/767,004.

Office Communication mailed Dec. 28, 2007 for U.S. Appl. No. 10/767,004.

Office Communication mailed May 28, 2008 for U.S. Appl. No. 10/767,004.

Office Communication mailed Nov. 13, 2008 for U.S. Appl. No. 10/767,004.

Office Communication mailed May 7, 2009 for U.S. Appl. No. 10/767,004.

* cited by examiner

MULTI-TIERED ANTI-ABUSE REGISTRATION FOR A MOBILE DEVICE USER

FIELD OF THE INVENTION

The present invention relates generally to computing security, and more particularly to registering a mobile device using a multi-tiered anti-abuse approach.

BACKGROUND OF THE INVENTION

In today's society, mobile computing devices are becoming increasingly more common. Many mobile computing devices (or simply, mobile devices), such as laptops, personal digital assistants, cellular phones, or the like, may be employed to obtain information from another computing device, such as a desktop computer, a server, or the like. For example, a user of the mobile device may seek to access a web page, a directory, or the like, from the other computing device.

Often during such communications, the other computing device may request registration of the mobile device and/or the user of the mobile device. The registration may be required to ensure that the user is permitted to access the information. The identification may also enable the other computing device to perform certain actions, or the like, for the mobile device. Registration may further enable tracking of activities, requests, or other behaviors associated with the user and/or the mobile device. Sometimes, such behaviors are used to influence how a web page is organized, what advertisements might be provided, or even how an organization might get paid. In some instances, registration enables the registrant to vote on actions. Thus, registration is an important aspect of online communications today.

However, there are many individuals that have created mechanisms that exploit simple registration designs to negatively influence actions, obtain improper access to information and content, take part in online pools, register for free merchandise, free accounts, or even provide spam. In response, more complex registration designs may be employed. However, registration designs are often created that may be too complex for some users, and worse yet, some mobile devices. If the registration designs are too complex, or can not be used on some mobile devices, there is a likelihood that users will simply not register. When this happens, there may be missed opportunities to learn more about the users, provide the users with valuable information, or enable the user to access desired information, merchandise, or the like. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
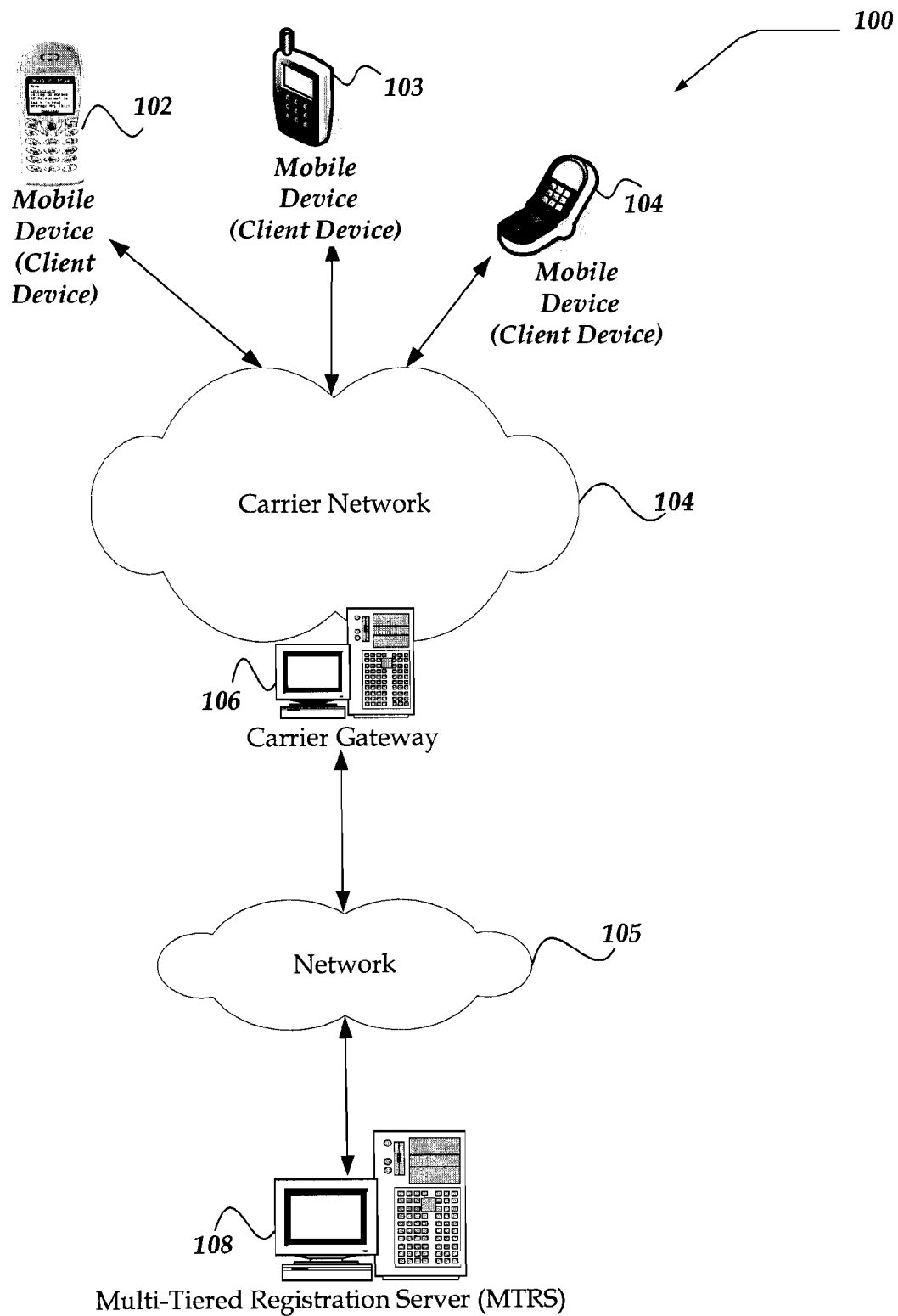
FIG. 1 shows a functional block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, various embodiments are directed towards providing a multi-tiered anti-abuse approach to registration of a mobile device user. Registration may be based on a request from the mobile device user, or from a service requesting that the mobile device user be registered. A server may determine whether a communications with the mobile device is through a trusted carrier gateway. A carrier gateway may be trusted based on a variety of mechanisms. For example, in one embodiment, the carrier gateway may be determined to be trusted if it provides an identifier, such as a Mobile Identification Number (MIN) number, an electronic serial number (ESN), or other mobile device identifier. If the carrier gateway is determined to be trustable, the mobile device identifier may be used to automatically register the mobile device and/or user. Where the carrier gateway is determined to be untrustable, a determination may be made whether the mobile device is configured to support a CAPTCHA (Completely Automated Public Turing test to tell Computers and Humans Apart) image or other form of a challenge-response image. In one embodiment, such determination may be based, in part, on information received from the mobile device through a user agent, or the like. If the mobile device is capable of supporting a challenge-response image, one may be sent to the mobile device to enable registration and to minimize registration abuse. If however, the mobile device might not support a challenge-response image and the carrier gateway is not trusted, the mobile device may be directed to an SMS mechanism to complete registration.

Registration of the mobile device may also be throttled to limit the number of attempts to register the mobile device. In one embodiment, throttling of multiple attempts to register may be performed by managing a number of attempts to register the same mobile device identifier within a given time period, restricting a number of SMS registration messages from the mobile device within the given time period, or the like.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes mobile devices 102-104, carrier network 104, network 105, carrier gateway 106, and Multi-Tiered Registration Server (MTRS) 108. Carrier network 104 is in communication with mobile devices 102-104 and through carrier gateway 106 with network 105. Network 105 is in communication with carrier gateway 106 and MTRS 108.

One embodiment of mobile devices 102-104 is described in more detail below in conjunction with FIG. 2. Generally, however, mobile devices 102-104 may include virtually any portable computing device capable of connecting to another computing device and requesting information. Mobile devices 102-104 may also be described generally as client devices that are configured to be portable. Thus, such devices include cellular telephones, smart phones, display pagers, radio frequency (RF) devices, infrared (IR) devices, integrated devices combining one or more of the preceding devices, or the like. Mobile devices 102-104 may also include other devices, such as Personal Digital Assistants (PDAs), handheld computers, tablet computers, personal computers, multiprocessor systems, microprocessor-based or programmable consumer electronics, network PCs, wearable computers, or the like. As such, mobile devices 102-104 typically range widely in terms of capabilities and features. For example, a cell phone may have a numeric keypad and a few lines of monochrome LCD display on which only text may be displayed. A web-enabled mobile device may have a touch sensitive screen, a stylus, and several lines of color LCD display in which both text and graphics may be displayed.

A web-enabled mobile device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), Compact HTML (cHTML), EXtensible HTML (xHTML), or the like, to display and send a message.

Mobile devices 102-104 also may include at least one other client application that is configured to receive content from another computing device. The client application may include a capability to provide and receive textual content, graphical content, audio content, or the like. The client application may further provide information that identifies itself, including a type, capability, name, or the like. In one embodiment, mobile devices 102-104 may uniquely identify themselves through any of a variety of mechanisms, including a phone number, Mobile Identification Number (MIN), a Mobile Subscriber Integrated Services Digital Network (MS-ISDN), an electronic serial number (ESN), or other mobile device identifier. In one embodiment, mobile devices 102-104 may also provide an application serial number, or the like, as an identifier.

A MIN may include a North American Numbering Plan (NANP) number that is configured to serve as a mobile telephone number for mobile devices 102-104. MINs may be programmed into mobile devices 102-104 at time of manufacture, purchase, or the like. In one embodiment, mobile devices 102-104 includes a mobile device identification component configured to provide the MIN, ESN, application serial number, or the like. In one embodiment, the mobile device identifier may be sent with each message to another computing device. However, the invention is not so limited, and the mobile device identifier may be sent based on a request for such information, an event, or so forth.

However, not all of mobile devices 102-104 may be configured to provide a mobile device identifier. Moreover, while mobile devices 102-104 may be configured to provide a mobile device identifier, in one embodiment, carrier gateway 106 may or may not be able to provide the mobile device identifier to another network device.

Mobile devices 102-104 may also be configured to provide information that may indicate a content format, and/or a capability of the mobile device. For example, in one embodiment, a client application may be configured to provide information about a type of mobile device, an application available on the mobile device, a screen resolution for the mobile device, or the like.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, or the like, between itself and another computing device. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, or the like.

Mobile devices 102-104 may further be configured to include a client application that enables the end-user to log into an end-user account that may be managed by another computing device. Such end-user account, for example, may be configured to enable the end-user to receive emails, send/receive IM messages, SMS messages, access selected web pages, participate in a social networking activity, or the like. Moreover, access to the end-user account, or to access other information, may include registering for the end-user account, access to the information, or the like. Such registration typically includes determining information about the end-user, and/or mobile device, to uniquely identifier the end-user and/or mobile device.

Carrier network 104 is configured to couple mobile devices 102-104 with carrier gateway 106. Carrier network 104 may include any of a variety of wireless sub-networks that may further overlay stand-alone ad-hoc networks, or the like, to provide an infrastructure-oriented connection for mobile devices 102-104. Such sub-networks may include mesh networks, Wireless LAN (WLAN) networks, cellular networks, or the like.

Carrier network 104 may further include an autonomous system of terminals, gateways, routers, or the like connected by wireless radio links, or the like. These connectors may be configured to move freely and randomly and organize themselves arbitrarily, such that the topology of carrier network 104 may change rapidly.

Carrier network 104 may further employ a plurality of access technologies including, but not limited to, 2nd (2G), 3rd (3G) generation radio access for cellular systems, WLAN, Wireless Router (WR) mesh, or the like. Access technologies such as 2G, 3G, and future access networks may enable wide area coverage for mobile devices, such as mobile devices 102-104 with various degrees of mobility. For example, carrier network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, carrier network 104 may include virtually any wireless communication mechanism by which information may travel between mobile devices 102-104 and carrier gateway 106. In one embodiment, carrier gateway 106 may reside within carrier network 104.

Carrier gateway 106 may include any computing device capable of connecting with mobile devices 102-104 to enable communications with another computing device, such as MTRS 108, or the like. Such devices include personal computers desktop computers, multiprocessor systems, microprocessor-based or programmable consumer electronics, network PCs, servers, or the like.

Carrier gateway 106 typically includes a carrier level service provider's computing device, and related infrastructure. Carrier gateway 106 may be configured to receive a network packet, or the like, from mobile devices 102-104. The network packet, or the like, may include information associated with mobile devices 102-104, such as a MN number, information associated with a user agent operating on mobile devices 102-104, or the like. The network packet may further include information associated with an end-user of mobile devices 102-104.

Carrier gateway 106 may be further configured to generate a subscription identifier based, in part, on the MIN number, and other information provided by mobile devices 102-104 that may uniquely identifier mobile devices 102-104.

Carrier gateway 106 may, in one embodiment, also be configured to provide information to MTRS 108. Such information may include, but is not limited to, the mobile device identifier, subscription identifier, a gateway group identifier or the like associated with carrier gateway 106, information associated with the user agent of mobile devices 102-104, information associated with the end-user of mobile devices 102-104, or the like. The subscription identifier may include information associated with the MN number, ESN, or the like, from the mobile device. In one embodiment, the gateway group information is provided in a header of a network packet associated with carrier gateway 106.

Network 105 is configured to couple MTRS 108 and its components with carrier gateway 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between carrier gateway 106 and MTRS 108.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of MTRS 108 is described in more detail below in conjunction with FIG. 3. Briefly, however, MTRS 108 may include any computing device capable of communicating with mobile devices 102-104. Such devices include personal computers desktop computers, multiprocessor systems, microprocessor-based or programmable consumer electronics, network PCs, servers, or the like.

MTRS 108 is further configured to enable registration of a user and/or a mobile device using a multi-tiered anti-abuse registration approach for mobile devices. In one embodiment, MTRS 108 may employ a process substantially similar to process 400 described below in conjunction with FIG. 4.

Illustrative Mobile Client Environment

Figure 2:
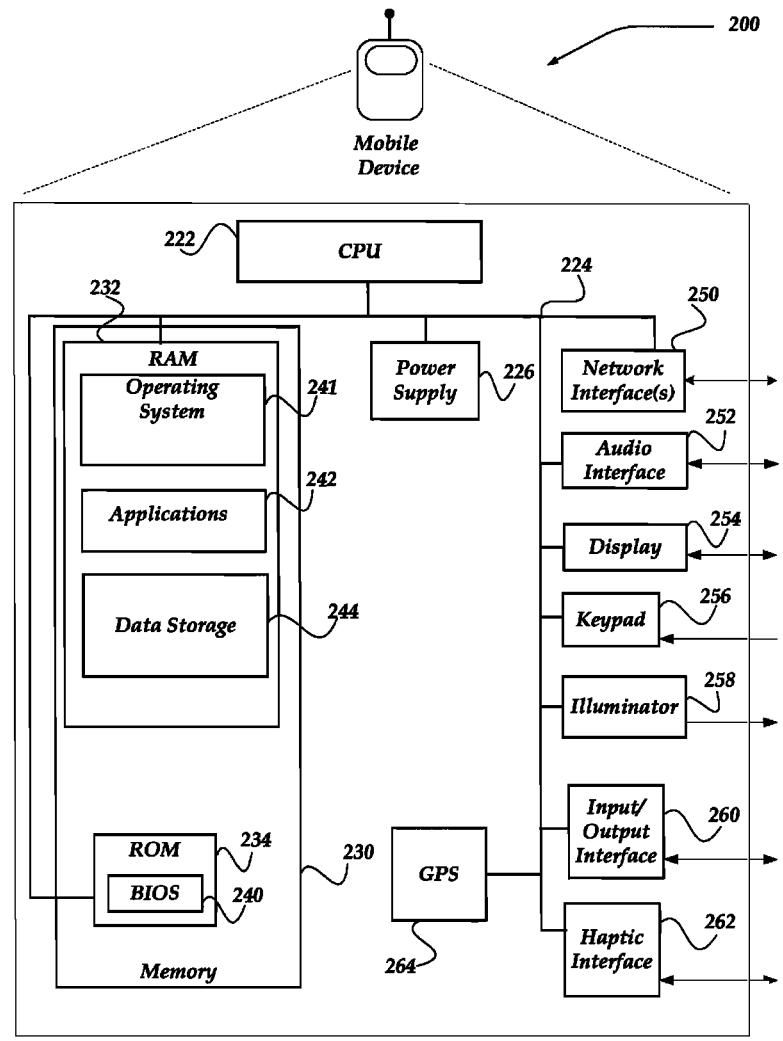
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values.

GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200, including, for example, a screen resolution, information indicating a type of application available on mobile device 200, a mobile device identifier, or the like. The information may then be provided to another device based on any of a variety of events, including being sent as part of a header during a communication, sent upon request, or the like. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VoIP applications, contact managers, task managers, transcoders, database programs, word processing programs, security applications, spreadsheet programs, games, search programs, and so forth.

Illustrative Server Environment

Figure 3:
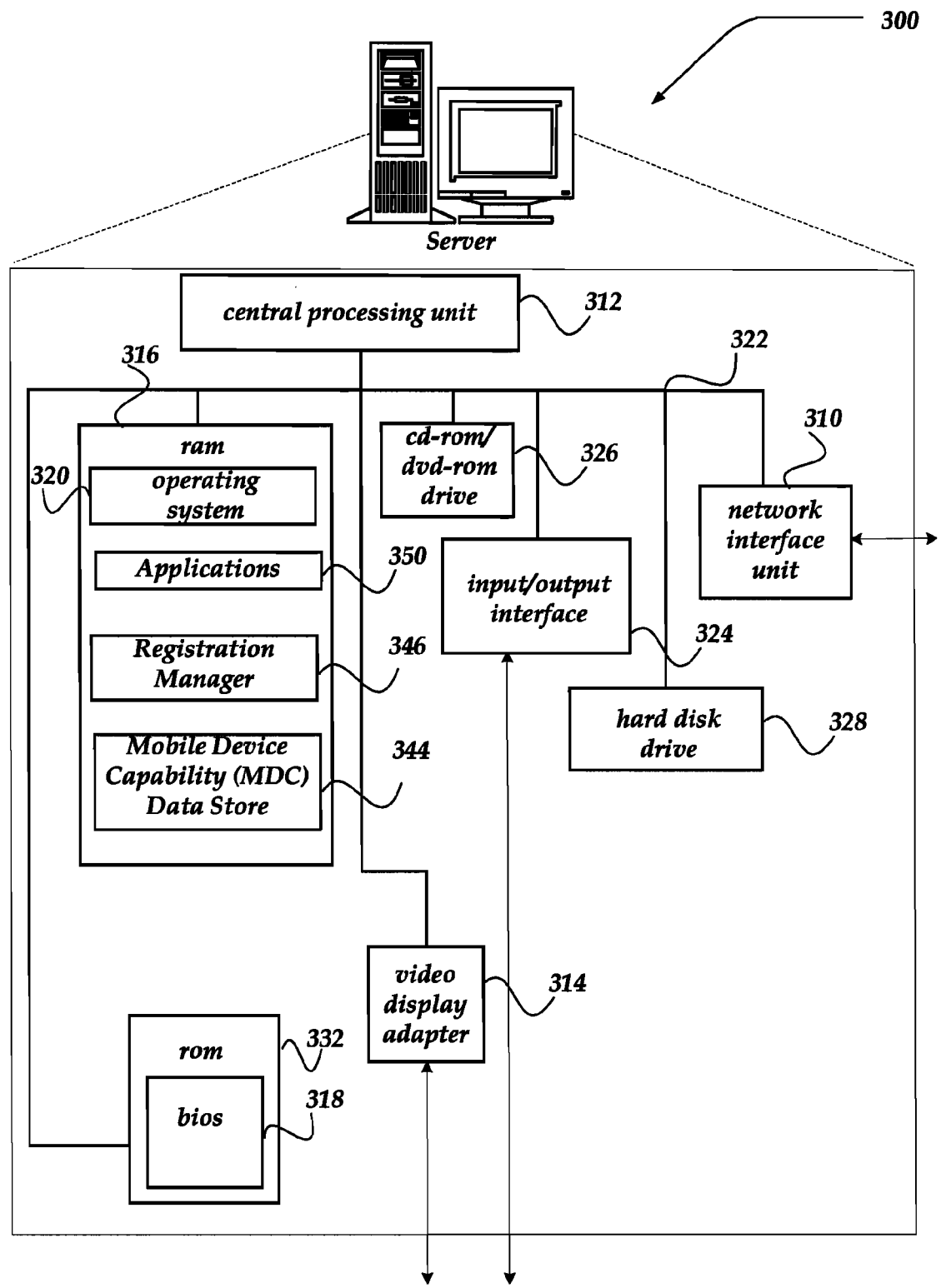
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MTRS 108 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, encryption programs, security programs, VPN programs, SMS message servers, IM message servers, email servers, account management and so forth. The mass memory may further include registration manager 346 and mobile device capability (MDC) data store 344.

MDC data store 344 may represent any of a variety of mechanisms directed towards receiving and managing information about a mobile device. As such, MDC data store 344 may include a spreadsheet, a file, a script, a database, or the like. The information within MDC data store 344 may include various characteristics of a mobile device such as might be obtainable from a mobile device's user agent profile. The user agent profile may include, for example, such as that defined by the User Agent Profile Specification available from the Wireless Application Protocol Forum, Ltd. Another example includes Composite Capability/Preference Profiles (CC/PP), defined by the World Wide Web Consortium. Further examples of profiles describing mobile device capabilities that may be employed include a mobile information device profile (MIDP), a wireless universal resource file (WURFL), or the like. User agent profiles or other similar profiles generally include attributes of a mobile device, such as a screen size, a screen resolution, a memory size, or the like. The invention, however, is not limited to these mechanisms to obtain information about a characteristic of a mobile device, and others may be employed, without departing from the scope of the invention.

Registration manager 346 is configured to enable registration of a mobile device user. Such registration may enable access to an account, access to a service, access to information, participation in a poll, access to an application, downloading of content, providing of content, receiving of content, or any of a variety of other actions that may be performed over a network. Registration typically includes obtaining information about an end-user and/or the mobile device to later uniquely identify the end-user and/or mobile device.

Registration manager 346 is configured to employ a multi-tiered approach to enable registration. In one embodiment, registration manager 346 employs a process such as described below in conjunction with FIG. 4 to perform such registration.

Generalized Operation

Figure 4:
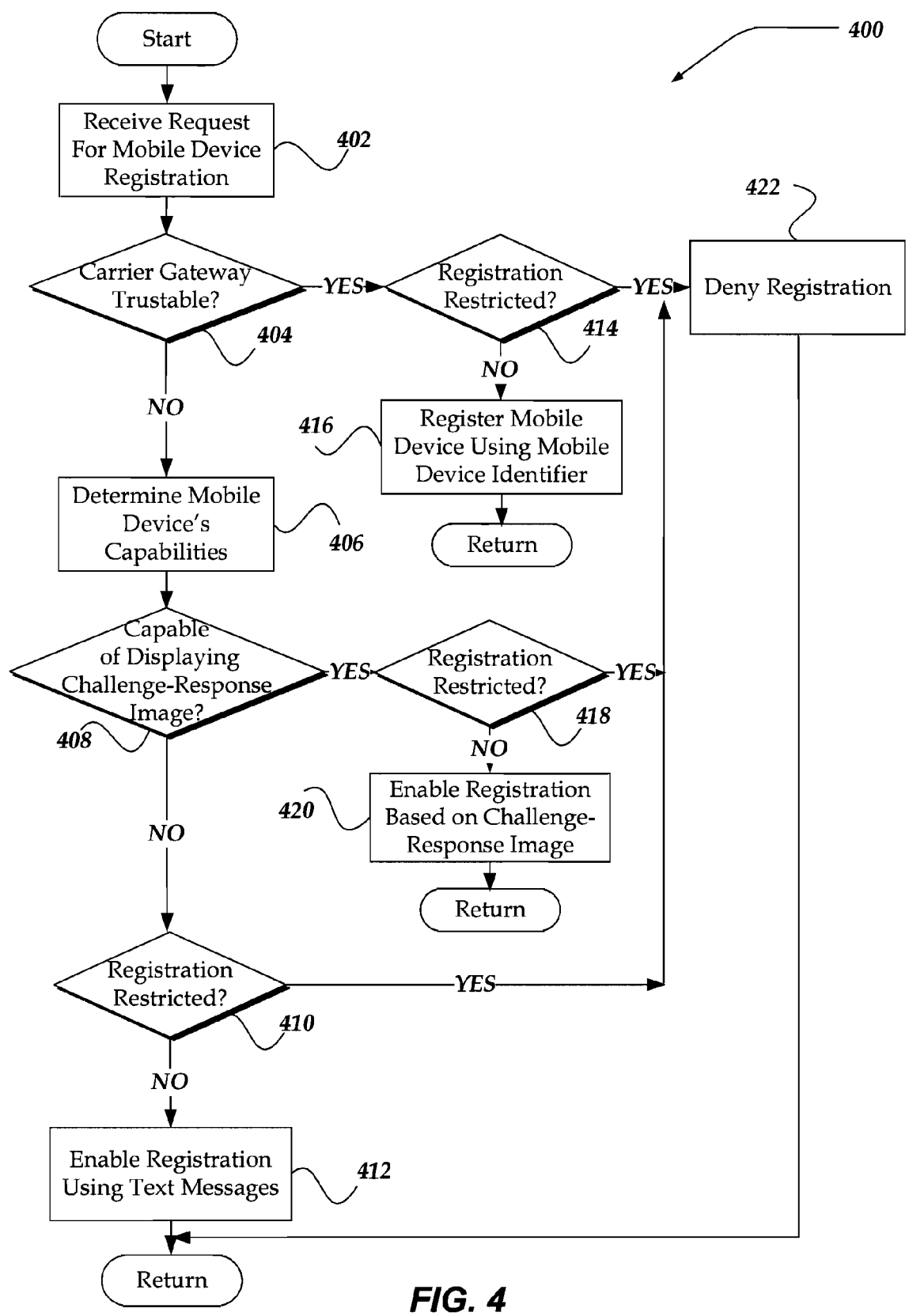
FIG. 4 illustrates a logical flow diagram generally showing one embodiment for enabling a mobile device be registered using a multi-tiered registration approach, in accordance with the present invention.

The operation of certain aspects of the present invention will now be described with respect to FIG. 4. FIG. 4 illustrates a logical flow diagram generally showing one embodiment for enabling a mobile device be registered using a multi-tiered registration approach. Process 400 of FIG. 4 may be implemented within MTRS 108 of FIG. 1.

As shown, process 400 begins, after a start block, at block 402, where a request for registration is received from a mobile device. In one embodiment, the mobile device may have been directed from a website, or the like, to a registration service. For example, an end-user may have attempted to access a service, content, or the like. However, the end-user and/or mobile device may not have been registered to access the service, content, or the like. Thus, in one embodiment, the end-user may be directed to the registration service. In one embodiment, the end-user may have received a message that directed the mobile device towards the registration service. Thus, the mobile device may have been directed towards the registration service through any of a variety of possible mechanisms. Moreover, in one embodiment, access of the registration service may be interpreted as a request for registration.

In any event, processing then proceeds to decision block 404, where a determination is made whether a carrier gateway associated with the mobile device is trustable. Trust of the carrier gateway may be determined employing any of a variety of mechanisms. In one embodiment, trust may be determined based on whether the mobile device, and/or the carrier gateway provides information about the mobile device, such as, for example, a mobile device identifier, an application serial number, a subscription identifier, or other unique identifier associated with the mobile device and/or end-user. Such information may be obtained as part of a communication from the mobile device, or as a result of a request for such information. In any event, if the carrier gateway is determined to be trustable, processing flows to decision block 414; otherwise, processing flows to block 406.

At decision block 414, a determination is made whether registration of the mobile device and/or end-user is to be restricted. Such restrictions may be performed to minimize abuse of registrations, such as might occur where a service is free, spamming is being attempted, or for any of a variety of other reasons. The determination may be implemented using a variety of mechanisms. For example, in one embodiment, where a mobile device identifier indicates that the mobile device is attempting to register more than a determined number of times within a defined time period, it may be determined that registration is to be restricted. Thus, if registration is to be restricted, processing flows to block 422; otherwise, processing flows to block 416.

At block 422, registration may be denied. Such registration denial may be indicated by providing to the mobile device a message indicating that the registration is denied. However, denial may also be indicated by preventing further actions to be performed that enable registration to be completed. In any event, processing then may return to a calling process to perform other actions.

At block 416, however, registration may be completed. In one embodiment, registration of the mobile device may be performed automatically, without further actions from an end-user of the mobile device. For example, in one embodiment, automatic registration may include providing the mobile device identifier, and/or other information to a data store, generating an account, or other association between the mobile device identifier and a service, resource, or the like. Processing then may return to the calling process to perform other actions.

At block 406, a determination of capabilities of the mobile device may be performed. Such determination may include obtaining information about the mobile device either, in part, from the mobile device, and/or from a data store. For example, a user agent profile associated with the mobile device may provide information about capabilities of the mobile device. Additional information may also be obtained from the data store. Such information may include whether the mobile device includes a browser application, and a screen capable of displaying a graphical image, or the like. In one embodiment, information may be obtained about a screen resolution.

Processing then continues to decision block 408, where a determination is made whether the mobile device is capable of supporting a display of a challenge-response image. In one embodiment, such capability may be based on whether the mobile device includes a screen capable of displaying a graphical image. In one embodiment, such capability may also be based on whether a resolution of the screen is above some defined resolution. However, the determination may also be based on a variety of other criteria, and is thus, not limited by these examples. In any event, if it is determined that the mobile device is capable, processing flows to decision block 418; otherwise, processing flows to decision block 410.

Decision block 418, may perform actions substantially similar to decision block 414, above. For example, in one embodiment, a determination is made whether registration of the mobile device and/or end-user is to be restricted. In one embodiment, where a challenge-response image has been provided to the same mobile device multiple times, it may indicate that the mobile device is attempting to register more than a determined number of times within a defined time period. It may be determined then that registration is to be restricted. Thus, if registration is to be restricted, processing flows to block 422; otherwise, processing flows to block 420.

At block 420, registration may be performed, at least in part, by using a challenge-response image to confirm that the request is from something other than an automated mechanism. Typical challenge-response mechanisms may include, but are not limited to CAPTCHA (Completely Automated Public Turing test to tell Computers and Humans Apart) techniques. CAPTCHA technique includes providing to the mobile device at least one alphanumeric character within a distorted image, sometimes with an addition of an obscured sequence of letters or digits. The provided image is often termed the challenge. The end-user of the mobile device is then expected to enter the sequence of characters, and send them to the registration service. This is the response. If the response matches the characters in the challenge, the end-user is permitted to proceed towards completion of registration. Registration may further include the end-user providing unique information, such as a user-name, password, access code, or the like, which may then be used to later uniquely determine the source of a request. In another embodiment, an access code might be automatically generated and provided to the end-user. However, any of a variety of mechanisms may be used to complete the registration. Therefore, the invention is not constrained by such subsequent actions. In any event, if the challenge-response image test is successful, registration may be completed. Otherwise, registration may be denied. In one embodiment, a defined number of attempts at the challenge-response image test may be allowed, before registration is denied. Upon completion of block 420, processing may return to the calling process to perform other actions.

At decision block 410, actions substantially similar to those described above for decision blocks 418 and 414 may be performed. In one embodiment, a determination as to whether multiple registration requests is coming from this mobile device might be made based on an access code, a user agent profile, or other characteristic of the mobile device. Thus, in one embodiment, if registration is restricted, processing may be directed to block 422; otherwise, processing proceeds to block 412.

At block 412, registration may be enabled through use of text-messages. For example, in one embodiment, a mobile-terminated text message, such as an SMS message, IM message, MMS message, or the like, may be sent to the mobile device. In one embodiment, the text message may include an access code useable to complete registration. In another embodiment, the text message may include a link, or other mechanism, configured to direct the mobile device towards a webpage for completion of the registration. In one embodiment, the end-user may enter the access code, and/or other information in a form, or the like, associated with the webpage.

In another embodiment, the end-user might be directed to send a mobile-originated text message. In one embodiment, the end-user might be provided an access code and/or address to use with the text message. For example, the registration service might display to the mobile device an address to send the text message, and an access code to use in the text message. In one embodiment, the address may include the access code. The end-user may then provide the text message to complete registration. Upon completion of block 412, then processing may return to the calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:

receiving, at a computing device over a network, a request for registration from a mobile device;

determining, via the computing device, that a carrier gateway associated with the mobile device is trustable, said trustable determination comprising receiving information corresponding to a mobile device identifier from the carrier gateway, said information comprising at least one item of information chosen from a group of information items consisting of a Mobile Identification Number, an Electronic Serial Number, and an application serial number;

automatically registering, via the computing device, the mobile device based on the mobile device identifier when the carrier gateway associated with the mobile device is determined trustable;

facilitating registration, via the computing device, of the mobile device based on the determination that the carrier gateway is untrustable and a determination that the mobile device supports a display of a challenge-response image, wherein said untrustable determination is based on a failure to receive said information; and facilitating registration, via the computing device, of the mobile device by employing a text-message mechanism when the challenge-response image is unsupportable on the mobile device.

2. The method of claim 1, further comprising:
if the mobile device has attempted to register more than a predetermined number of times within a defined time period, denying another registration attempt by the mobile device.

3. The method of claim 1, wherein the Mobile Identification Number, the Electronic Serial Number, and the application serial number each are useable as the mobile device identifier.

4. The method of claim 1, wherein employing a text-messaging mechanism further comprises:
receiving a mobile-originated text message from the mobile device, wherein the text message includes an access code; and
if the mobile device has not attempted to register more than a determined number of times within a defined time period, registering a user of the mobile device.

5. The method of claim 1, wherein employing a text-messaging mechanism further comprises:
sending a message-terminated text message to the mobile device, wherein the text message includes an access code;
receiving the access code from the mobile device; and
if the mobile device has not attempted to register more than a determined number of times within a defined time period, using the access code to register a user of the mobile device.

6. A non-transitory computer-readable storage medium tangibly encoded with computer-executable instructions, that when executed by a processor associated with a computing device, performs a method comprising:
receiving, over a network, a request for registration from a mobile device;
determining that a carrier gateway associated with the mobile device is trustable, said trustable determination comprising receiving information corresponding to a mobile device identifier from the carrier gateway, said information comprising at least one item of information chosen from a group of information items consisting of a Mobile Identification Number, an Electronic Serial Number, and an application serial number;
registering the mobile device based on the mobile device identifier when the carrier gateway associated with the mobile device is determined trustable, said registration is independent of an action from a user of the mobile device if the mobile device is unregistered;
facilitating registration of the mobile device_based on the determination that the carrier gateway is untrustable and a determination that the mobile device supports a display of a challenge-response image, wherein said untrustable determination is based on a failure to receive said information; and
facilitating registration of the mobile device by employing a text-message mechanism when the challenge-response image is unsupportable on the mobile device.

7. The non-transitory computer-readable storage medium of claim 6, further comprising:
denying registration if the mobile device has attempted to register more than a predetermined number of times within a defined time period.

8. The non-transitory computer-readable storage medium of claim 6, wherein the challenge-response image comprises employing at least one distorted image.

9. The non-transitory computer-readable storage medium of claim 6, wherein employing a text-messaging mechanism comprises communicating an access code to the mobile device in a Short Message Service (SMS) message, and registering the mobile device upon recognition of the access code being entered into a webpage from the mobile device.

10. The non-transitory computer-readable storage medium of claim 6, wherein said determination that the mobile device supports a display of a challenge-response image comprises:
determining if the mobile device is configured to display an image with a screen resolution above a defined resolution.

* * * * *